(12) United States Patent
Bhardwaj et al.

(10) Patent No.: US 6,566,010 B1
(45) Date of Patent: *May 20, 2003

(54) HIGH ENERGY, LIGHTWEIGHT, LEAD-ACID STORAGE BATTERY

(75) Inventors: Ramesh Bhardwaj, Walnut, CA (US); John B. Timmons, Winston-Salem, NC (US); Joseph A. Orsino, San Clemente, CA (US)

(73) Assignee: Concorde Battery Corporation, West Covina, CA (US)

( * ) Notice: Subject to any disclaimer, the term of this patent is extended or adjusted under 35 U.S.C. 154(b) by 162 days.

This patent is subject to a terminal disclaimer.

(21) Appl. No.: 09/714,738

(22) Filed: Nov. 16, 2000

(51) Int. Cl.[7] .............................................. H01M 4/68
(52) U.S. Cl. ..................................... 429/225; 429/245
(58) Field of Search ............................. 429/225, 245; 29/2

(56) References Cited

U.S. PATENT DOCUMENTS

| | | | |
|---|---|---|---|
| 2,739,997 A | 3/1956 | Carrick et al. | |
| 3,884,716 A | 5/1975 | Walker | 136/26 |
| 4,151,331 A * | 4/1979 | Hug et al. | 429/228 |
| 4,554,228 A | 11/1985 | Kiessling | 429/242 |
| 4,760,001 A | 7/1988 | Nann et al. | 429/136 |
| RE33,133 E | 12/1989 | Kiessling | 429/242 |
| 5,045,086 A | 9/1991 | Juergens | 29/623.1 |
| 5,047,300 A | 9/1991 | Juergens | 429/94 |
| 5,198,313 A | 3/1993 | Juergens | 429/94 |
| 5,334,464 A * | 8/1994 | Rowlette | 429/210 |
| 5,368,961 A | 11/1994 | Juergens | 429/233 |
| 5,677,078 A | 10/1997 | Juergens et al. | 429/94 |
| 5,820,639 A | 10/1998 | Snyder et al. | 29/623.5 |
| 6,316,148 B1 * | 11/2001 | Timmons et al. | 29/2 |

OTHER PUBLICATIONS

AMP Journal of Technology vol. 1; article entitled Conducting Polymer Blends as Inert Electrodes; James L. Joyce, Jr. et al.; 1991.

AMP Journal of Technology Vo. 5; article entitled Anisotropic Conductive Film with Arrayed Conductive Particles.

* cited by examiner

Primary Examiner—Patrick Ryan
Assistant Examiner—Gregg Cantelmo
(74) Attorney, Agent, or Firm—Womble Carlyle Sandridge & Rice, PLLC

(57) ABSTRACT

Lightweight, low resistance electrode plates for lead-acid batteries are formed from a highly conductive non-lead substrate with a corrosion prevention layer and a continuous layer of a corrosive resistant conductive materials, such as lead, applied from a fused salt bath.

12 Claims, 3 Drawing Sheets

HIGH ENERGY, LIGHTWEIGHT, LEAD-ACID STORAGE BATTERY

FIELD OF THE INVENTION

The present invention is directed to lead-acid batteries, and particularly to lightweight, high energy batteries having electrodes formed of a non-lead, lightweight conductive substrate covered by a corrosion prevention layer and a lead, outer layer.

BACKGROUND OF THE INVENTION

Lead-acid batteries conventionally include a multiplicity of cells connected together in series. Each cell consists of a stack of alternating electrodes, namely cathodes and anodes. Often there is a separator between the electrodes whick absorbs and holds the electrolyte (generally sulfuric acid).

In the past, electrode plates have been formed primarily of lead castings, stampings, or an expanded mesh of lead or of a lead compound which provides the structural element to support the electrochemically active material of the electrode. When charged, the electrodes become positively or negatively charged, where the energy is stored, until used in whatever application the battery is put. The battery may also be recharged from time to time.

Lead has been predominately used as the plates such batteries for a long period of time. While lead is not particularly a good conductor of electricity, it is inherently corrosive resistant to the electrolytic acids. Other, more conductive metals are either too expensive to be used as the electrode for lead-acid batteries, or else they are quickly corroded during the charging action by the electrolytic acids. Therefore lead has remained as the predominant material. Lead is also very heavy, and in applications where weight is a factor, other alternatives have long been sought.

For example, in the aircraft industry, experts have calculated that the fuel cost of flying a commercial airliner is more than $3,000 per year per pound of weight flown. Therefore, if the airplane carries batteries having lead plates, considerable sums of money could be saved per plane if a lighter weight plate material could be found.

In previous attempts to replace lead as the predominant material, one approach has been to plate lead onto other more conductive metals or metal alloys such as aluminum and copper. Copper is sixteen times as conductive as lead and weighs only about 70% as much. Aluminum, on the other hand has a specific gravity of only 20%–25% of lead and approximately eight times the conductivity of lead. Obviously, from the standpoint of weight and conductivity, copper and aluminum are good candidates to replace lead as the substrate for electrodes. However both materials are very susceptible to corrosion in the presence of sulfuric acid, and cannot be used as the electrode in a lead acid battery if left unprotected. Either material can be used as the negative electrode, and copper has in the past when coated with lead. In previous attempts to use aluminum or copper as the primary structural element for the plates of a lead acid battery in the past, attempts have been made to plate lead coatings onto aluminum or copper substrates. The conventional manner for plating lead is from an aqueous solution. A problem arises when lead is plated directly on a substrate from an aqueous solution. For one reason or another, the coatings are porous, and the sulfuric acid will quickly penetrate the coatings and attack the aluminum or copper. In such instances, the copper and aluminum plates have not survived the charging operation.

SUMMARY OF THE INVENTION

The present invention is directed toward reducing the weight per unit mass of the battery by replacing a significant portion of the lead or lead alloy plates of the battery with a lighter weight, conductive material that is protected from the corrosive effects of the electrolytic acid by the combination of a corrosive prevention layer plated with lead or a lead alloy. Toward this end, then, the present invention utilizes a highly conductive non-lead, lighter weight substrate as the structural material for lead-acid battery electrode plates. The non-lead substrates may be aluminum, magnesium, copper, aluminum alloys, or aluminum/magnesium alloys, plastic coated with graphite, or other conductive structures. A substrate formed from any of these materials is significantly lighter than lead, having a specific gravity of no greater than 70% that of lead. The substrate may be formed as a sheet, a wire mesh, an expanded metal mesh, or a perforated sheet.

The non-lead substrate is coated with a relatively thin corrosion prevention layer of such materials as nickel, silver or gold that is resistant to the electrolytic acid to be used in the battery. As used herein, "corrosion prevention" includes metals having a high resistance to corrosion and oxidation such as nickel, silver and gold. This corrosion prevention layer is plated onto the lightweight substrate by electroplating or an electro-less plating procedure.

Following plating of the corrosion prevention layer, a continuous outer layer of lead or a lead alloy may be applied. Because of the added protection provided by the corrosion prevention layer, the continuous outer layer need only be sufficiently thick to provide adequate life to the battery, as for example, 0.001 to 0.002 inches. As a result of applying the corrosion prevention layer, the outer layer of lead, lead compound, or other suitable outer layer of conductive corrosive resistant material may be applied by any of the conventional methods for coating such as dipping, molten salt bath deposition, electroplating by aqueous solution, or spray, vacuum, or plasma deposition. By first coating the lightweight conductive substrate with the relatively thin corrosion prevention layer of nickel, gold or silver, the porosity of the outer layer is of less concern. Further sealing of the outer conductive layer may provide an additional measure of protection to increase the life of the battery.

By constructing an electrode plate as described above, the energy to weight ratio, when compared to conventional lead plate cells, is in the range of 35–65 Watt-hours/kilogram (WH/kg) or more. That is to say, rather than an energy to weight ratio of approximately 30 WH/kg as in the case of conventional lead plate lead-acid batteries, the energy to weight ratio of batteries of the present invention may be in the range of about 35–65 WH/kg or more.

The electrode of the present invention are pasted with conventional negative or positive pastes and charged to create corresponding electrodes. These electrodes may be utilized in any number of battery cell configurations. Alternating positive and negative electrode plates are generally separated by a separator such as a thin glass mat (which absorbs and carries the electrolytic acids) and arranged in a conventional parallel plate arrangement.

DESCRIPTION OF THE PREFERRED EMBODIMENTS

Figure 1:
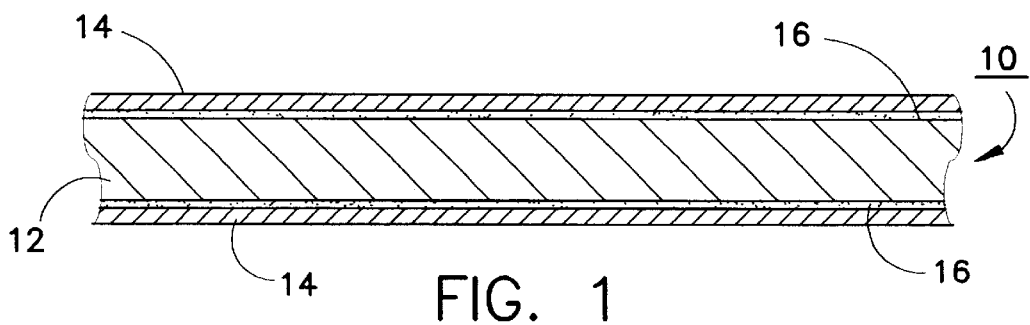
FIG. 1 is a cross-sectional view of an electrode plate according to the present invention.

Referring now to FIG. 1, there is illustrated a plate 10, for forming either a positive or negative electrode for a lead-acid battery cell. Toward this end, plate 10 is formed with a lightweight non-lead, conductive substrate 12 which serves as a low resistance, current collector. Substrate 12 may be formed as either a continuous or perforated sheet, a wire mesh, or as a series of wires spaced apart from one another. If formed as a sheet, the wires are between about 0.001 inches and 0.050 inches thick, and if formed as a wire mesh, the wires substrate 12 are between about 0.005 inches and 0.050 inches in diameter.

To protect substrate 12 from attack by the electrolytic acid of the battery, a corrosion protection layer 16 is applied. The corrosion protection layer 16 may be nickel, silver or gold. A corrosion protection layer 16 of approximately 0.00001 and 0.0005 inches provides a significant degree of corrosion prevention, thus permitting the final outer layer 14 to be only sufficiently thick to provide adequate life to the battery (for example about 0.001 inches to 0.002 inches).

Figure 4:
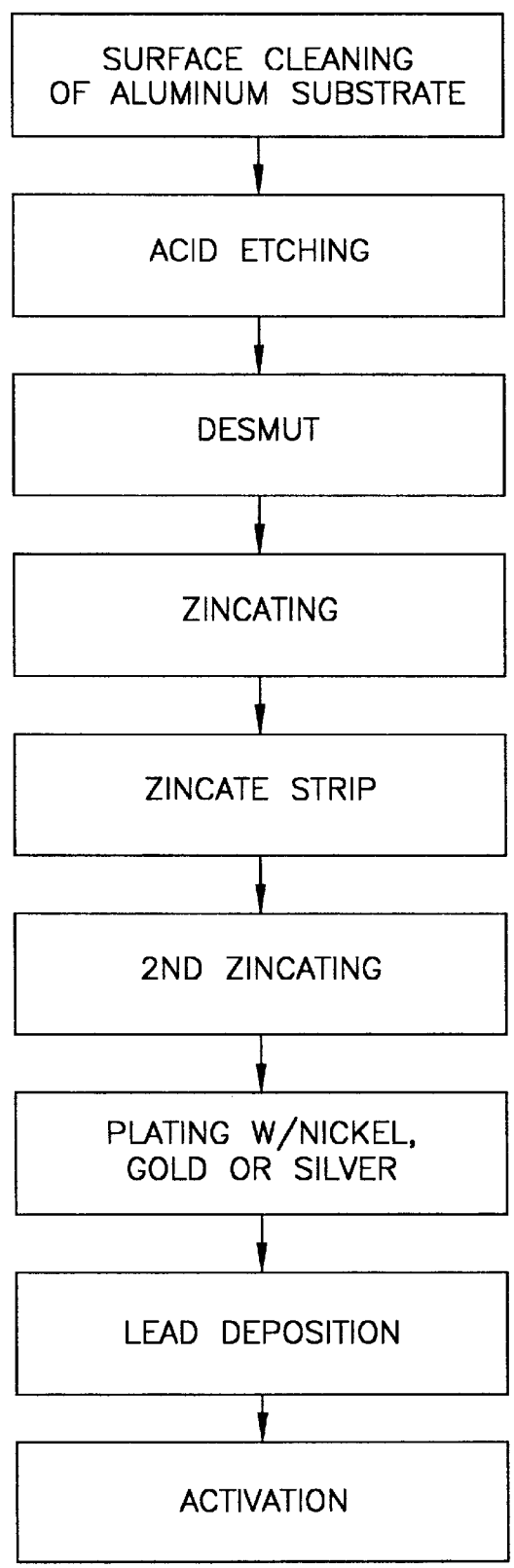
FIG. 4 is a flow chart depicting the steps for forming an electrode plate according to the present invention.

By way of example, the steps for applying a layer 16 of gold on an aluminum substrate are described herein; however, the steps for applying the other suitable corrosion prevention metals such as nickel and silver, are substantially similar and known in the art. FIG. 4 depicts the basic steps for forming plate 10. Substrate 12 is first soak cleaned at about 160 degrees F. for 3 to 5 minutes in an alkaline solution to remove any organic impurities from the surface. After the soak, the substrate is rinsed in de-ionized water. Substrate 12 is then hot acid etched at about 130 degrees F. in diluted sulfuric acid to remove any oxide layer completely from the surfaces of the substrate. The etching time depends on the thickness of oxide present. The acid etch is followed by a water rinse to clean the acid residue. The cleaned substrate 12 is immersed in a mixture of triacid (50% HNO3+25% $H_2SO_4$+25% water) to remove any impurities left by the acid etch. This is commonly known as deoxizination, or desmut. Next, the substrate 12 is immersed in a zinc solution for 30 to 60 seconds where zinc is deposited on the surface of substrate 12. While applying the zinc coating in a single step provides sufficient preparation of substrate 12, repeating the coating better prepares the aluminum for a more uniform coating of nickel. Thus, the initial layer of zinc is stripped away using a 30% nitric acid solution at room temperature for approximately 20 seconds and then rinsed with water. Substrate 12 is then coated with zinc again in a zinc solution. Substrate 12 is now ready for plating with gold. For electro-less plating, the aluminum substrate 12 is immersed in an electro-less gold solution at an elevated temperature (for example 185 degrees F.) for a period of between 1 minute and 10 minutes, depending on the thickness of layer 16 desired. This process removes the zinc from the aluminum substrate and plates the gold. Layer 16 is then rinsed with water to remove any residue. Substrate 12 with the gold layer 16 is activated using a gold strike just before applying outer layer 14. This involves immersing the coated substrate in a solution of nickel, silver or gold compounds and a 10% solution of hydrochloric acid at room temperature (approximately 70 degrees F.) for 0.1 to 2 minutes and then rinsing with water.

Substrate 12 with the corrosion prevention layer 16 is then plated with a thin layer (for example 0.001 inches to 0.002 inches) of lead or lead alloy 14 using one of several methods, including dipping, immersion in a molten salt solution, electroplating or by vacuum, spray, or plasma deposition. For example, the gold-coated substrate may be immersed in a molten lead or lead alloy bath at temperatures ranging from 900 degrees F. to 960 degrees F. for 2 to 10 seconds to get the desired thickness. If electroplating, an non-aqueous bath may be used to deposit an outer layer 14 of desired thickness. A fluoroborate bath of one liter may be formulated from 333 milliliters of a 50% solution of lead fluoroborate, 8 milliliters of floroboric acid (49% solution), 50 milliliters of RTL No. 326 (available from Macdermid Incorporated, Santa Ana, Calif.), 15 grams of boric acid, and enough water to make 1 liter of solution (approximately 600 milliliters). This results in a solution having a pH between about 1.2 and 1.4. The solution is maintained between 70 degrees F. and 130 degrees F. The coated substrate described above is used for the cathode. The anode may be pure lead or lead alloy. An anode to cathode ratio of 2 to 1 and a cathode current ranging from 5 to 50 amps per square foot will yield a satisfactory plating.

Following application of outer lead layer 14, outer layer 14 may be optionally sealed by any one of several conventional means. One sealing technique involves immersing the plate 10 in a heated non-aqueous liquid such as peanut or canola oil at a temperature that causes any pores in the conductive outer layer 14 to close and seal. Sealing is generally not a requirement, however, because of the protection provided by corrosion prevention layer 16.

Figure 2:
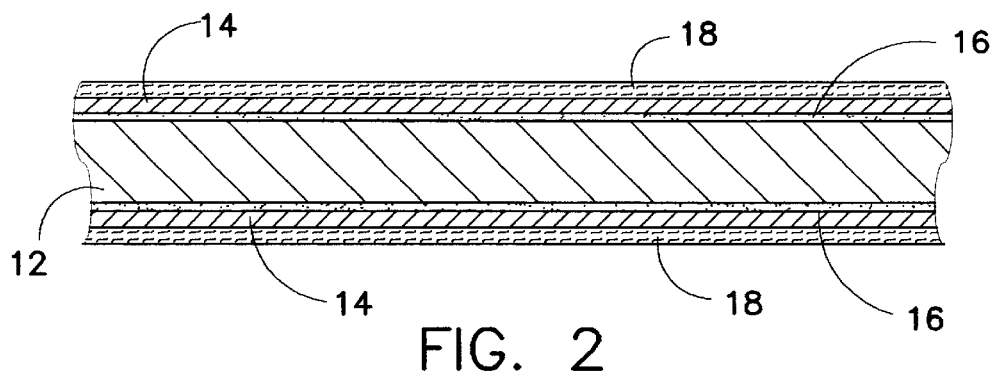
FIG. 2 is a cross-sectional view of the electrode plate of FIG. 1 further including a layer of electrochemically active paste on each side.

Referring to FIG. 2, the plate 10 is later coated with a suitable electrochemically active paste 18 to a thickness of up to 0.100 inches and charged according to conventional techniques to form either a negative or positive electrode.

Figure 3:
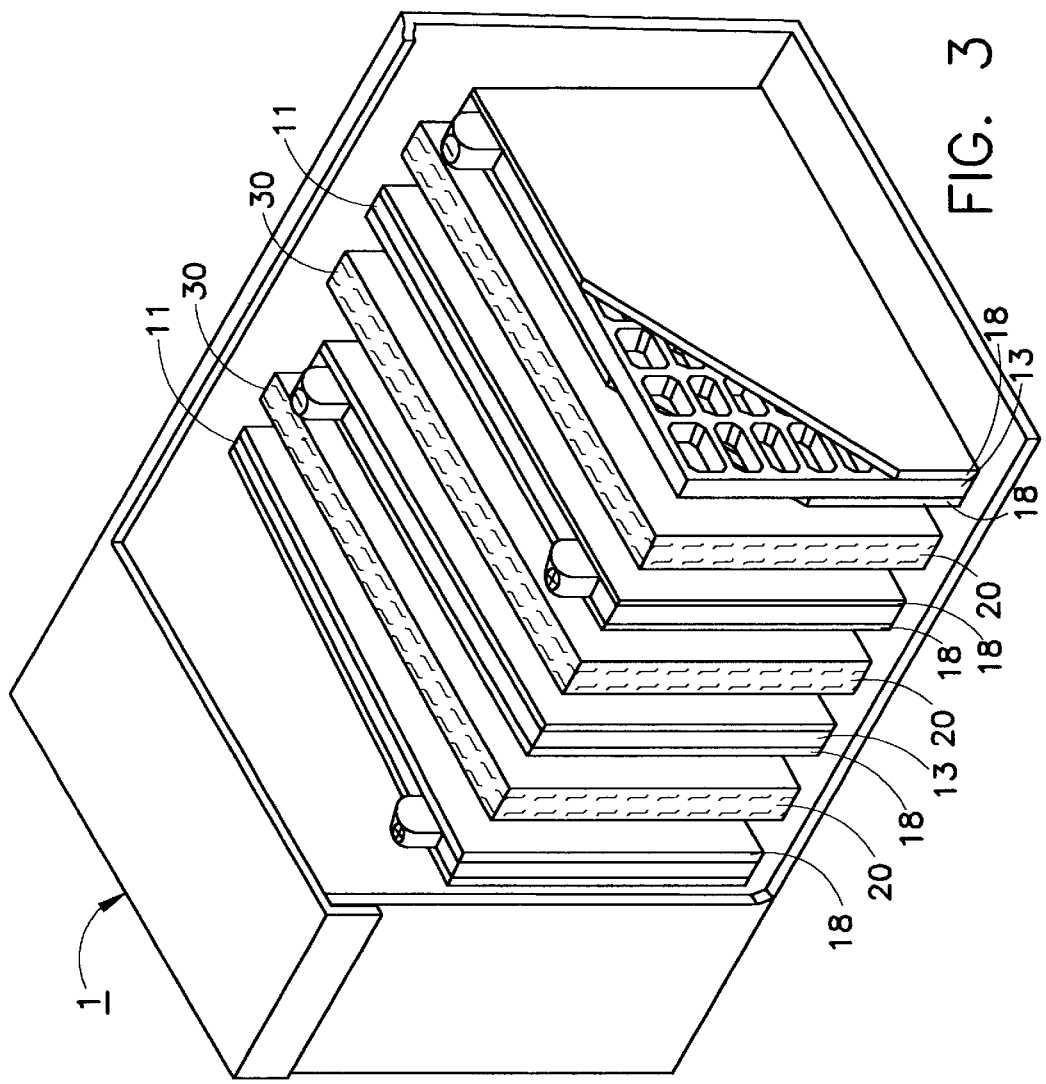
FIG. 3 is a perspective view of an electrochemical cell schematically representing positive and negative electrode plates constructed according to the present invention and maintained apart by glass mat separators with the spacing therebetween being greatly exaggerated.

Turning now to FIG. 3, an electrochemical cell (battery) is represented in which positive plates 11 and negative plates 13 are arranged alternatively with intervening separators 20. It should be noted that, while the plates and separators are spaced apart for illustrative purposes, they are actually in contact with each other in use. Both the positive plates and the negative plates 11, 13 consist of lead coated aluminum substrates having a layer of suitable electrochemically active paste 18 on and in between both major surfaces. The positive electrodes and negative electrodes include terminals extending therefrom and are each conventionally connected to form an electrochemical cell.

Certain modifications and improvements will occur to those skilled in the art upon a reading of the foregoing description. It should be understood that all such modification and improvements, while not discussed in detail hereinabove, are properly within the scope of the following claims.

We claim:

1. Lightweight, monopolar electrode for lead-acid batteries having at least one set of alternating monopolar anodes and cathodes based in a compartment containing electrolyte said electrode.

a) a current collecting, conductive, non-lead substrate having a thickness in the range of 0.001 inches to 0.050 inches, a specific gravity no greater than 70% that of lead, and having a terminal extending from one edge;

b) a corrosion prevention layer having a thickness in the range of 0.00001 inches to 0.00050 inches and covering the non-lead substrate;

c) an outer protective layer of lead or a lead alloy; and d) a layer of appropriate electrochemical paste covering the outer layer to form a monopolar electrode having an energy to weight ratio of at least 35 watt-hours/kg.

2. The monopolar electrode according to claim 1 wherein said substrate is formed from a material selected from the group consisting of graphite coated plastic and graphite coated fiberglass.

3. The monopolar electrode according to claim 1 wherein said substrate is selected from the group of materials consisting of aluminum, magnesium, copper and alloys thereof.

4. The monopolar electrode according to claim 3, wherein said substrate is selected from the group consisting of sheet material, wire mesh, expanded metal mesh, and perforated metal sheets.

5. The monopolar electrode according to claim 1 wherein said corrosion prevention layer is selected from the group consisting of nickel, silver and gold.

6. The monopolar electrode according to claim 1 wherein the outer lead layer is 0.001–0.002 inches thick.

7. A lead-acid battery having at least one set of alternating monopolar anodes and cathodes housed in a compartment containing electrolyte, wherein at least the cathodes comprise:

a) a current collecting, conductive, non-lead substrate having a thickness in the range of 0.001 inches to 0.050 inches, a specific gravity no greater than 70% that of lead, and having a terminal extending from one edge;

b) a corrosion prevention layer having a thickness in the range of 0.00001 inches to 0.00050 inches and covering the non-lead substrate;

c) an outer protective layer of lead or a lead alloy;

d) said outer layer being substantially covered by a layer of electrochemically active paste and conventionally charged as cathodes; and e) wherein the energy to weight ratio of the electrode so formed is at least 35 watt-hours/kg.

8. The lead-acid battery according to claim 7 wherein said substrate is formed from a material selected from the group consisting of graphite coated plastic and graphite coated fiberglass.

9. The lead-acid battery according to claim 7 wherein said substrate is selected from the group of materials consisting of aluminum, magnesium, copper and alloys thereof.

10. The lead-acid battery according to claim 7 wherein said substrate is selected from the group consisting of sheet material, wire mesh, expanded metal mesh, and perforated metal sheets.

11. The lead-acid battery according to claim 7 wherein said corrosion prevention layer is selected from the group consisting of nickel, silver and gold.

12. The lead-acid battery according to claim 7 wherein the outer lead layer is 0.001–0.002 inches thick.

* * * * *